US012741441B2

(12) United States Patent
Deman et al.

(10) Patent No.: US 12,741,441 B2
(45) Date of Patent: Sep. 22, 2026

(54) METHOD FOR MANUFACTURING A COATED PANEL AND A LAMINATED DECORATIVE MATERIAL

(71) Applicant: UNILIN, BV, Wielsbeke (BE)

(72) Inventors: Jonas Deman, Sint-Amandsberg (BE); Benny Schacht, Vlamertinge (BE)

(73) Assignee: UNILIN, BV, Wielsbeke (BE)

(*) Notice: Subject to any disclaimer, the term of this patent is extended or adjusted under 35 U.S.C. 154(b) by 280 days.

(21) Appl. No.: 18/563,559

(22) PCT Filed: May 19, 2022

(86) PCT No.: PCT/IB2022/054674
§ 371 (c)(1),
(2) Date: Nov. 22, 2023

(87) PCT Pub. No.: WO2022/248988
PCT Pub. Date: Dec. 1, 2022

(65) Prior Publication Data

US 2024/0269954 A1 Aug. 15, 2024

(30) Foreign Application Priority Data

May 25, 2021 (EP) .................................... 21175584

(51) Int. Cl.
*B32B 3/06* (2006.01)
*B32B 5/02* (2006.01)
(Continued)

(52) U.S. Cl.
CPC ................ *B32B 3/06* (2013.01); *B32B 5/022* (2013.01); *B32B 5/024* (2013.01); *B32B 7/12* (2013.01);
(Continued)

(58) Field of Classification Search
CPC ............. E04F 13/0866; E04F 13/0871; E04F 13/0873; E04F 13/0875; E04F 13/0876;
(Continued)

(56) References Cited

U.S. PATENT DOCUMENTS

2019/0263101 A1 8/2019 Pervan

FOREIGN PATENT DOCUMENTS

EP 1938963 A1 7/2008
EP 2339092 A1 6/2011
(Continued)

OTHER PUBLICATIONS

International Search Report and Written Opinion for Application No. PCT/IB2022/054674 dated Jul. 27, 2022.

*Primary Examiner* — Zachary M Davis
(74) *Attorney, Agent, or Firm* — KDW FIRM PLLC

(57) ABSTRACT

The invention relates to a method for manufacturing a coated panel (1), said method at least comprising: the step of providing a top layer material (2) at least comprising a decorative layer (14) including thermosetting resin; the step of providing adhesive material (4); the step of extruding a synthetic substrate material (3) in a continuous manner; said synthetic substrate material (3) at least comprising polymeric material; characterized in that the method further comprises the step of adhering, in a continuous manner, said top layer material (2) to said substrate material (3) by means of at least said adhesive material (4), wherein said step of adhering takes place inline with said step of extruding said substrate material (3).

12 Claims, 3 Drawing Sheets

(51) Int. Cl.

| | |
|---|---|
| ***B32B 7/12*** | (2006.01) |
| ***B32B 27/10*** | (2006.01) |
| ***B32B 27/12*** | (2006.01) |
| ***B32B 27/20*** | (2006.01) |
| ***B32B 27/30*** | (2006.01) |
| ***B32B 27/32*** | (2006.01) |
| ***B32B 27/36*** | (2006.01) |
| ***B32B 27/40*** | (2006.01) |
| ***B32B 29/00*** | (2006.01) |
| ***B32B 29/02*** | (2006.01) |

(52) U.S. Cl.

CPC .............. *B32B 27/10* (2013.01); *B32B 27/12* (2013.01); *B32B 27/20* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *B32B 29/005* (2013.01); *B32B 29/02* (2013.01); *B32B 2250/40* (2013.01); *B32B 2255/12* (2013.01); *B32B 2264/104* (2013.01); *B32B 2307/554* (2013.01); *B32B 2307/732* (2013.01)

(58) Field of Classification Search

CPC ....... E04F 13/0878; E04F 13/18; E04F 15/00; E04F 15/105; E04F 15/107

See application file for complete search history.

(56) References Cited

FOREIGN PATENT DOCUMENTS

| | | | |
|---|---|---|---|
| EP | 2957691 | A1 | 12/2015 |
| WO | 9747834 | A1 | 12/1997 |
| WO | 2020050713 | A1 | 3/2020 |
| WO | 2020095196 | A1 | 5/2020 |

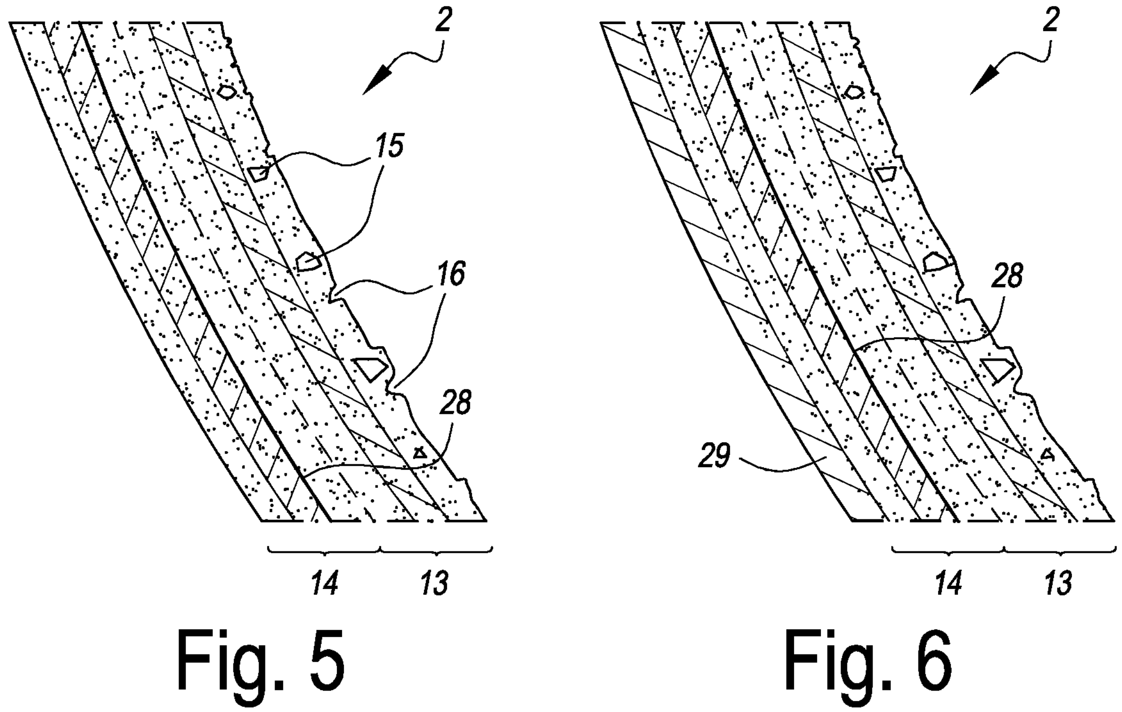
Fig. 5
Fig. 6
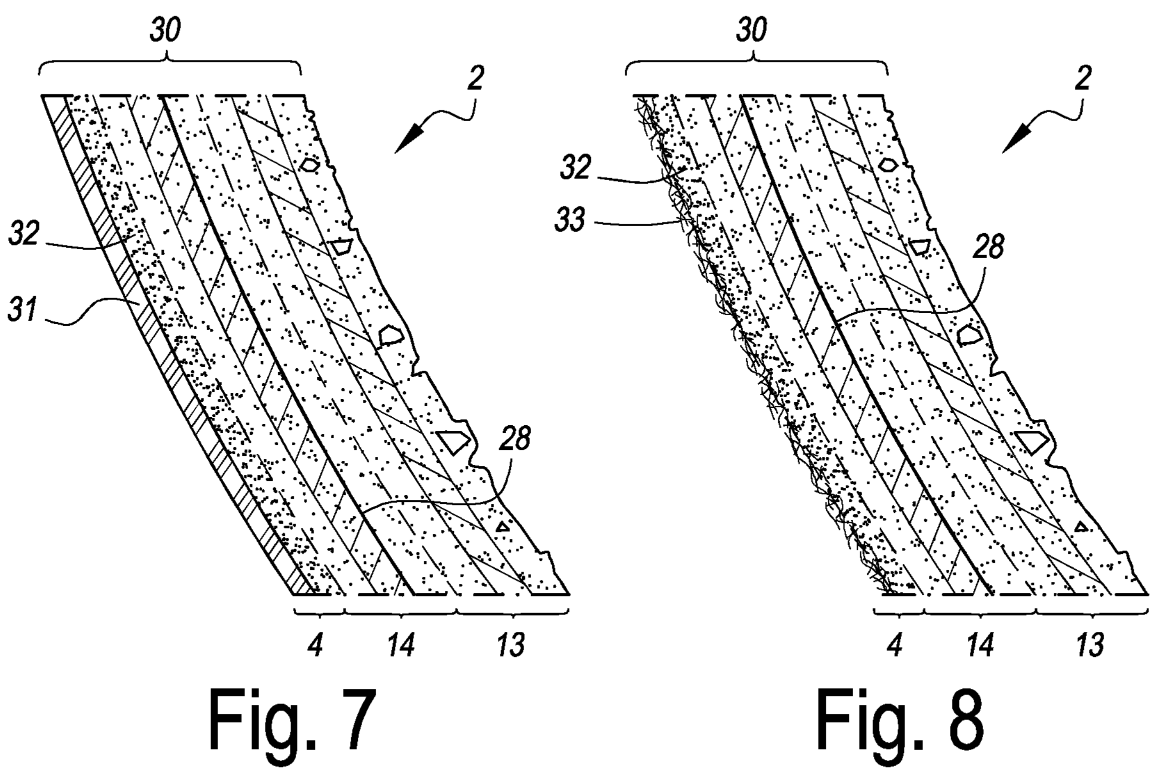
Fig. 7
Fig. 8

METHOD FOR MANUFACTURING A COATED PANEL AND A LAMINATED DECORATIVE MATERIAL

The present invention pertains to the technical field of methods for manufacturing coated panels. Further, the invention relates to a coated panel and a laminated decorative material for the use in the method.

Flooring panels comprising laminated decorative material are known from WO 97/47834. The panels of WO'834 may comprise a wood-based material as a core and a paper and resin based top layer. Wood-based materials or derivatives thereof are known for their sensibility to water which results in water adsorption over the time leading to the panel damage, characterized by an impaired look and loss of mechanical properties. Also, the high proportion of wood-based material typically present in such panels does not allow to significantly reduce the relatively high impact sound emanating from the panels.

In the field of decorative panels, such as floor and wall coverings, panels based on plastic materials, such as soft PVC (polyvinyl chloride), also called vinyl tiles or vinyl strips are gaining more and more importance as an alternative for wood-based materials or derivatives thereof. Such panels are disclosed for example in EP 1 938 963 or EP 2 339 092. These panels are seen as water-resistant due to the plastic core, and sound-absorptive due to the presence of a soft wear layer, mostly consisting of PVC.

Panels based on plastic materials have proven to be visually appealing, inexpensive and relatively easy to install. Such panels are typically waterproof and can therefore also be used for rooms that are exposed to water and other liquids and humidity. Swelling of the material after contact with a liquid is omitted, while an improved impact sound absorption can be achieved by, for example, using a soft PVC core or a backing layer.

EP 2 957 691 relates to a panel wherein the panel has a sandwich structure which comprises a central layer basically composed of a thermoplastic material, a rigid top layer and a rigid bottom layer, wherein the rigid top layer and the rigid bottom layer each comprise at least one ply of a cellulose-based layer and a cured resin. In one embodiment, EP '691 concerns a top layer comprising a paper and the resin which comprises preferably a melamine resin. Such panels have an improved scratch resistance, however the method of manufacturing such panels may be inefficient.

The present invention is in the first place aiming at an alternative and more economic method for manufacturing coated panels. In accordance with preferred embodiments a solution is offered for one or more of the problems associated with methods for manufacturing of coated panels of the prior art. Further, the present invention aims to a provision of an alternative laminated decorative material, which may be suitable for use in said method for manufacturing coated panels.

In accordance with a first independent aspect, the present invention relates to a method for manufacturing a coated panel, said method at least comprising the following steps:

- the step of providing a top layer material at least comprising a decorative layer including thermosetting resin;
- the step of providing adhesive material;
- the step of extruding a synthetic substrate material in a continuous manner; said synthetic substrate material at least comprising polymeric material;

characterized in that the method further comprises the step of adhering, in a continuous manner, said top layer material to said substrate material by means of at least said adhesive material, wherein said step of adhering takes place inline with said step of extruding said substrate material.

According to the method of the present invention, the top layer comprising at least a decorative layer and thermosetting resin, is being adhered inline with said extruding of the synthetic substrate material. Since the step of adhering could be performed in a continuous manner, the method of the invention provides for a more fluent and continuous method for production of coated panels. The method of the invention is particularly suitable for coated panels which feature a synthetic substrate material such as solid plastic composite (SPC) and a thermosetting resin treated top layer, such as melamine-treated paper laminate top layer. According to the method of the present invention, a continuous process is used to adhere the top layer material to the synthetic substrate material. Discontinuous operation steps are preferably omitted, such as method steps involving opening and closing a press. Thus, the method of the invention leads to a more continuous and less costly production of coated panels.

The method of the invention is particularly suited for a production of coated panels which feature a synthetic core, preferably the core comprising a thermoplastic material. More particularly, the method of the invention is particularly suited for synthetic material, which may be extruded inline with adhering the top layer. In the preferred embodiment of the first aspect of the invention, the synthetic substrate material comprises at least polymeric material. Preferably, said polymeric material is chosen from the list consisting of polyvinyl chloride (PVC), polyethylene (PE), polypropylene (PP), polyurethane (PU), and/or polyethylene terephthalate (PET) and/or polyester. In another embodiment, said polymeric material comprises at least a mixture of polymeric material chosen from the list consisting of PVC, PE, PP, PU, PET and/or polyester. It should be understood by the person skilled in the art that any kind of polymeric material suitable for an extrusion process may be used in order to produce said synthetic substrate material.

In a preferred embodiment, the synthetic substrate material is SPC (Solid or Stone Plastic Composite), i.e. a filled synthetic composite material comprising thermoplastic material and an inorganic filler material, that is free or essentially free from foamed areas. In a further preferred embodiment, said synthetic substrate material is any filled synthetic composite comprising, preferably mainly comprising, said, preferably thermoplastic, polymeric material and a filler material. According to a preferred embodiment, said polymeric material and a filler material comprise at least 50 wt. % of said synthetic substrate material, preferably at least 70 wt. % of said synthetic substrate material. In a particularly preferred embodiment, said synthetic substrate material essentially, i.e. at least for 95 wt. %, consists of said polymeric material and a filler material.

Various filler materials may be used in obtaining filled synthetic composite suitable to be used as a synthetic substrate material in the method according to the first aspect of the invention. Some of the non-limiting examples of said fillers are calcium carbonate ($CaCO_3$), sand, lime, kaolin, metakaolin, wollastonite, magnesium oxide, magnesium chloride, magnesium carbonate, glass, talc, carbon black, wood dust, bamboo dust, rubber, cork, straw, and paper. In a preferred embodiment, the filler material used in filled synthetic composite comprises at least calcium carbonate. Preferably, said filler is present in a content of at least 30 wt. %, preferably of at least 40 wt. %. In a particularly preferred embodiment, said synthetic substrate material comprises calcium carbonate as a filler, preferably in a weight ratio with said polymeric material of 1:1 or larger, preferably of 2:1 or larger, wherein a weight ratio of 3.5:1 or larger is not excluded.

In an alternative embodiment according to the invention said synthetic substrate material has a foam structure. The foam structure consists basically of a thermoplastic matrix in which closed and/or open cells are present, preferably said foam is a closed-cell foam, i.e. a foam where at least the majority of the cells are closed. The foam structure may be obtained by adding blowing agents to the thermoplastic melt, before it is formed and hardened into its final shape. As the foam structure has a lower density than a solid structure, the weight of the central layer is reduced which could be advantageous for manufacturing the coated panel of the invention.

The substrate material may be free from layer shaped reinforcement materials, such as glass fiber layers. It is not excluded however that said substrate material is reinforced, preferably by further comprising reinforcing materials. Various reinforcing materials may be present within the substrate material of the invention, such as glass fiber, either randomly distributed as separate fibers, or in the form of a net or fleece of glass fiber.

The method according to the first aspect of the invention aims to adhering of the top layer material onto the said synthetic substrate material, said top layer material at least comprising a decorative layer including thermosetting resin. According to a preferred embodiment, the thermosetting resin in the top layer material is at least semi-cured, and preferably fully cured, prior to said step of adhering. The top layer material comprising thermosetting resin has been found to be particularly advantageous for a provision of good mechanical properties and robustness of the top layer on one hand, and for assisting to a good and continuous adhesion of the top layer material to the synthetic substrate material.

In a particularly preferred embodiment, the top layer material is a laminated decorative material comprising a plurality of paper and/or resin layers. The plurality of paper layers are preferably layers of paper that have been impregnated with a thermosetting resin, preferably a melamine resin, and then pressed to form a laminated decorative material assembled from thermosetting resin-treated paper and/or resin layers. The top layer material of the invention may comprise paper layers which may be impregnated to a various degree or non-impregnated paper layers, as well as thermosetting resin layers. Said paper and/or resin layers may be transparent, opaque or to feature a decor.

Alternatively, the top layer material may further comprise other layers, such as polymer material layers.

In a preferred embodiment, said top layer material is or comprises a so-called CPL or continuously pressed laminate. Preferably, said top layer material or CPL comprises of a number of paper and/or resin layers, including said decorative layer having the thermosetting resin. In a preferred embodiment, the layers of said top layer material or CPL are pressed and consolidated, while the thermosetting resin is being cured. During the pressing process, the action of heat and pressure on the thermosetting resin-treated papers acts to liquefy and cure the resin, and thereby bond the various individual layers to each other. Preferably, CPL is produced in continuous manner, preferably by means of double-belt presses, preferably with a compression force of between 30 and 70 bar and preferred temperatures between 150° C. and 170° C. It should be understood by a skilled person that CPL may be produced by any other suitable equipment and using any other suitable conditions.

In a particularly preferred embodiment, the CPL comprises at least two paper layers, wherein one paper layer comprises a decor and may be a decorative layer, while one paper layer may be transparent and located on a side of the decor of the decorative layer forming a wear layer. Preferably one or both of said paper layers are resin impregnated and the resin impregnated transparent paper layer may further comprise wear-resistant particles. In another embodiment, the CPL comprises at least three paper layers, wherein one paper layer comprises a decor and may be a decorative layer, while one paper layer may be transparent and located on a side of the decor of the decorative layer forming a wear layer, while one paper layer may be opaque, or colored and preferably non-fully saturated by the thermosetting resin, and may be located on the bottom of said CPL, i.e. on a side of the decorative layer which is opposite to the decor. Preferably one, two or all three of said paper layers are resin impregnated and the resin impregnated transparent paper layer may further comprise wear-resistant particles. In the case the paper located on the bottom of the CPL is not fully saturated with resin, i.e. substantially free from resin in a portion of its thickness at its bottom side, it forms a good absorptive surface for the adhesive material, and may lead to an increased delamination resistance.

In an alternative embodiment, said top layer material may be pressed to a thin, typically not more than 2 mm thick board material, wherein said decorative layer is set above the said board material by means of direct pressed lamination (DPL). In the alternative embodiment, said board material is a part of the top layer material, and said board material preferably comprises a board chosen from the group consisting of particle, HDF or MDF board. Preferably the board material comprises a bottommost portion having a density lower than 950 kg/m$^3$, or even lower than 850 kg/m$^3$. Such a density may still allow for absorption of the adhesive material, e.g. because such material is relatively porous. The porosity allowing the adhesive material to become somewhat penetrated in the bottom surface of the board material may also be obtained through other means. It is not excluded that the top layer material at the bottom of said board material comprises a further layer, preferably having said absorptive properties. The board material is of thickness of not more than 2 mm, preferably not more than 1 mm. DPL process includes forming of a stack comprising at least one or more paper and/or resin layers, including at least said decorative layer having the thermosetting resin, which form a top layer material together with said board material located beneath said decorative layer. Said top layer may optionally feature a protective layer on top of said decorative layer, wherein said protective layer is based on resin and/or paper. Said stack is pressed and the press treatment results in a mutual connection or adherence of the decorative layer, to the board and the optional protective layer on the top, as well as in a hardening of the resin present in the stack.

In a preferred embodiment and as exemplified by some of the above embodiments of e.g. CPL and DPL, the top layer material may be a laminated material comprising a plurality of paper and/or resin layers, which are laminated, and said laminated material comprises a transparent paper sheet at the side of said decorative layer having a decor and/or a underlaying paper sheet at the side of said decorative layer opposite said decor. The upper surface of the top layer which comprises said decorative layer and is covered with a transparent paper and/or resin layer gives the top layer an enhanced scratch resistance. In a particularly preferred embodiment, the wear layer comprises wear-resistant particles, such as corundum, ceramic particles and the like.

According to the preferred embodiment, the decorative layer is a resin-impregnated or resin-treated paper layer which features a decor used to give the top layer a specific design appearance. Preferably, said decorative layer comprises at least a paper which is printed prior to impregnation with a thermosetting resin. In the preferred embodiment, said paper is impregnated with a melamine resin. In an alternative embodiment, said decor paper is an impregnated paper, that has been at least partially impregnated with the resin before printing the decor. According to a preferred embodiment, at least a decorative paper can be printed so as to appear to be wood-grain motif, or the like, or to provide other appearances, such as stone or ceramic, or the like. Prior to printing, the decorative paper layer can be opaque and/or colored so as to form a base color for the decor, and so as to hide the appearance of the underlaying layers and synthetic substrate material, from view. The decor can be printed onto the decorative layer using any suitable printing technique.

The decor of the decorative paper layer may be a semi-transparent color, or an image that covers only a portion of the paper, and thus, allow at least part of the synthetic substrate material to be visible. The decor may also be a solid printed image, or a printed background color or image, which ensures that the final image will substantially block the visibility, or the color, of the synthetic substrate material. In a preferred embodiment, a separate, preferably opaque paper layer could be used to block the color or features of the synthetic substrate material.

The decor of the decorative layer can be any suitable size or shape, and may be scaled to allow for shrinkage or expansion of the paper during the thermosetting resin treatment process, and/or optional pressing or embossing steps.

The thermosetting resin is preferably applied using any suitable technique. In a preferred embodiment, the decorative layer comprises at least a paper, and said paper is treated with said thermosetting resin so as to impregnate the paper. In a preferred embodiment, said decorative layer is produced in a way to have the thermosetting resin situated throughout the paper. The decorative layer can be produced with standard paper impregnation treating equipment, such as by immersing the paper into a resin bath, by roller application and/or by spraying, preferably followed by drying the resin-provided paper by means of a hot-air oven, infrared radiation and/or microwaves.

Preferably said decorative layer represents a wood, stone, concrete or metal imitating decor, anyway it is noted that it can represent any kind of design.

In a preferred embodiment, said decorative layer comprising the decor is printed in a multi-pass digital printing process. Alternatively, the digitally printed decor can be printed in a single-pass digital printing process. Multi-pass printing is obtained by more economic printers than single pass printing, thereby providing for printing of very small batches and prototypes.

In another preferred embodiment, said decorative layer comprising the decor may be obtained via an analogue printing technique, preferably gravure printing.

In a particularly preferred embodiment said thermosetting resin in the top layer material comprises melamine resin. Melamine resin is particularly advantageous as it offers a good scratch resistance and mechanical properties of a top layer. It was found that a melamine resin-impregnated top layer could be efficiently adhered to the synthetic substrate material by means of various adhesive compounds, such as polymer adhesive material or a hot melt glue.

In another preferred embodiment, said thermosetting resin comprises a crosslinked or cross linkable acrylic or unsaturated polyester resin. It has been found that a at least partial replacement of melamine resin in the top layer material would be possible by using another thermosetting resin, such as crosslinked or cross linkable acrylic or unsaturated polyester resin. Such resins improve the mechanical properties and the scratch resistance of the top layer, and are shown to be suitable to be used in CPL laminates.

In a preferred embodiment, the thermosetting resin comprises additives which contribute to chemical and mechanical properties of said thermosetting resin. In a preferred embodiment, said thermosetting resin may comprise polymer additives and stabilizers, colorants, plasticizers, fillers, reinforcement particles, shrinkage modifiers, rheology modifiers, agents to modify wetting and adherence characteristics, and the like.

In a preferred embodiment, said thermosetting resin, particularly in the cases when said thermosetting resin comprises a crosslinked or cross linkable acrylic or unsaturated polyester resin, is submitted to a radiation curing after said step of providing said top layer material. The radiation curing of the thermosetting resin has been found to be particularly advantageous due to cheapness, speed, control, simplicity of formulation and operation and low toxicity. A UV and/or visible light radiation is used to induce photochemical polymerization or crosslinking of the thermosetting resin, using the appropriate initiator, preferably a photo initiator. The photo initiator is chosen so to control the curing of the resin and to allow the fast and economic curing of the top layer material.

Especially in the case of acrylic or unsaturated polyester resins, UV curing was found to be particularly advantageous in order to obtain a more uniform curing. Such resins are disclosed, for example in WO 2020/095196. In another embodiment, the thermosetting resin comprises photo initiators which allow for LED curing or visible light curing.

In a further preferred embodiment, said top layer material comprises a transparent paper sheet provided at the side of said decorative layer having a decor and/or a underlaying paper sheet at the side of said decorative layer opposite said decor. The transparent paper sheet is preferably impregnated with a thermosetting resin and used as a wear layer. Said transparent paper sheet preferably further comprises the wear-resistant particles, such as corundum, ceramic particles and the like, which particles incorporated in a thin layer of thermosetting resin, preferably melamine resin. In the preferred embodiment said wear layer is laminated, or otherwise attached to the decorative layer and the thermosetting resin. The underlaying paper sheet at the side of said decorative layer opposite said decor is preferably only partially impregnated, i.e. not-fully impregnated.

In a preferred embodiment, the method of the invention comprises the step of providing a lacquer layer on top of said top layer material. The lacquer layer offers an additional protection of the top layer and improved esthetics. Preferably, said lacquer layer is made of at least one transparent lacquer layer. More preferably, said lacquer layer is made of at least two layers of transparent lacquer. Preferably, said lacquer is a polyurethane based lacquer. In a further preferred embodiment, wear-resistant particles have been incorporated into said lacquer layer. In another preferred embodiment, said lacquer layer is UV-curable. In another preferred embodiment, said lacquer layer is embossed together with a top layer material, preferably embossed in register with the decorative layer of the top layer material.

In a preferred embodiment, said top layer material is provided from a roll, and is, preferably continuously, unrolled to be adhered to said substrate material. Such provision of the top layer is advantageous for a more economic, automated and continuous method of the invention. It should be understood by a skilled person that any other suitable provision of the top layer material may be used without departing from the scope of the present invention.

In a further preferred embodiment said top layer material is provided with a surface texture, more particularly, said top layer material is embossed in an optional embossing step, wherein the upper surface of the coated panel or the top layer material is provided with a surface texture. In a preferred embodiment, the surface texture is provided on a top layer material during its manufacture. In a particularly preferred embodiment, the top layer is preferably a CPL which is pre-embossed during the manufacture, i.e. the surface texture is present on said top layer material before adhering to the synthetic substrate material. In an alternative embodiment, the surface texture may be provided on the top layer during or after the step of adhering the top layer material to the synthetic substrate material by means of structured embossing plate or roller. In a preferred embodiment, the surface texture can be provided on the upper surface of the top layer, in the form of a relief, which, for example, imitates a real surface structure, for example, of wood or the like.

During the optional embossing step, the surface texture can be applied onto the top layer which will preferably match the underlying decor layer in the design of the coated panel. This can be achieved using a registered embossing technique wherein the texture is applied to the top layer of the coated panel so that the texture matches the decor layer. For example, if the decorative layer includes the image of a wood grain, the top layer is embossed with a wood grain texture that matches the decor layer, and thus provides the impression and feel of a natural wood product.

According to the method of the invention, the step of adhering of the top layer material to the synthetic substrate material is done by means of at least adhesive material.

In one preferred embodiment, said adhesive material is provided in between said top layer material and the synthetic substrate material, for example by suitable technique such as spraying or applying by a roll, or the like. In a preferred embodiment, the adhesive material may be sprayed on the bottom layer of the top layer, i.e. onto the outermost layer on the side opposite of the decor of the decorative layer and/or preferably sprayed onto the surface of the synthetic substrate material that is oriented towards the top layer material. In a particularly preferred embodiment, said top layer material comprises at least a portion of said adhesive material on a bottom of said top layer material and/or at least a portion of said adhesive material is provided at the bottom of said top layer material. In an alternative embodiment, said adhesive material may be provided in a separate layer and/or as a foil in between said top layer material and the synthetic substrate material. In another alternative embodiment, said adhesive material may be provided as a textile, woven or non-woven in between the top layer material and the synthetic substrate material. In another particularly preferred embodiment, the adhesive material may be provided in form of fibers, which fibers are at least partially adhered on the bottom layer of the top layer material, i.e. onto the outermost layer of the top layer material on the side opposite of the decor of decorative layer.

In another further preferred embodiment, said top layer material comprises on said bottom, i.e. the outermost layer on the side opposite of the decor of the decorative layer a layer, preferably a paper layer, which layer has absorbed or absorbs at least a portion of said adhesive material. In a particularly preferred embodiment of the invention, said top layer comprises a plurality of paper and/or resin layers, preferably laminated together to form for example a CPL. In said CPL, a paper layer placed on a side opposite of the decor of the decorative layer, preferably at the bottom of the top layer is preferably only partially impregnated with resin, more preferably a non-impregnated paper layer. In such manner, the paper layer placed on the bottom of the top layer, may be suitable for the adsorption or absorption of at least a part of said adhesive material. This would allow better adhesion of the top layer to the synthetic substrate material and yield a more robust coated panel.

In another particularly preferred embodiment, at least a portion of said adhesive material is provided on said substrate material after extrusion, and/or is comprised in said extruded substrate material. The adhesive material may be co-extruded with the synthetic substrate material. Such co-extrusion is particularly advantageous as it leads to a more economic process with less processing steps, as well as the better adhesion of such co-extrudate to the top layer material.

In a further preferred embodiment, said adhesive material comprises at least a polymeric material identical to the polymeric material of said synthetic substrate material. This leads to a faster and more economic method for producing coated panels. Furthermore, such choice of the adhesive material does not require any additional adjustment of the process or the equipment.

In a particularly preferred embodiment, said adhesive material at least comprises polyurethane or polyester or copolyester or acrylic resin or polyvinyl acetate. It should be understood that any other polymer material which may be suitable for a good and firm adhesion of a top layer material preferably based on a thermosetting resin impregnated paper and the synthetic substrate material such as SPC may be used. Some non-limiting examples of such adhesive materials are cyanoacrylates, urethanes, epoxies, polyamides, ethylene-vinyl acetate, a variety of block copolymers and elastomers such as butyl rubber, ethylene-propylene copolymer, and styrene-butadiene rubber or any mixture thereof.

In a preferred embodiment said adhesive material is a hotmelt glue. The term "hotmelt glue" refers to a thermoplastic adhesive, which can be molten under the heat and can be dispensed out of nozzles which allow a uniform distribution of such adhesive material onto a surface of the top layer material and/or thermoplastic substrate material. The hot melt glue solidifies over the time, which consolidates the adhesive material. In an alternative embodiment, the hotmelt glue further comprises photo initiators which allow UV or LED or visible light curing of the hot melt glue.

In another preferred embodiment said adhesive material comprises melt fibers, preferably provided as a non-woven textile comprising such fibers. In a further preferred embodiment said melt fibers comprise at least a polymeric material identical to the polymeric material of said synthetic substrate material. In another preferred embodiment, said melt fibers comprise at least one of the following: polyurethane, polyester, copolyester, acrylic resin, polyvinyl acetate, cyanoacrylates, urethanes, epoxies, polyamides, ethylene-vinyl acetate, a variety of block copolymers and elastomers such as butyl rubber, ethylene-propylene copolymer, and styrene-butadiene rubber. Said melt fibers may also be formed as so-called bicomponent fibers, i.e. a fiber comprising in its cross-section two different materials. The materials can e.g. be positioned side-by-side or concentric in a core-shell configuration. One or both components may take part in adhering said top layer material to said substrate material. In case only one of said components takes part in said adhering, preferably the other component may reinforce the obtained panel at least to some extent.

In a preferred embodiment, said extruded material is calibrated to the desired thickness and optionally structured prior to adhering said top layer material thereto. The synthetic substrate material is preferably an SPC or a filled thermoplastic composite material. The method of the invention is particularly suitable for adjusting the thickness of the synthetic core material, by variation in extrusion parameters. In a preferred embodiment, said extruded synthetic substrate material and optionally an adhesive material are provided as a layer of a substantially uniform thickness, whereby the top layer is adhered onto it in line with the extrusion step. In such preferred embodiment, an optional embossing step is preformed onto the top layer, preferably before the adhesion of the top later material onto the synthetic substrate material. In an alternative embodiment, the extruded synthetic substrate material and optionally an adhesive material may undergo a separate embossing step, in order to achieve a surface texture which may or may not correspond to the top layer.

In another preferred embodiment, said method further comprises the step of providing a backing material, and the step of applying said backing material to the side of said synthetic substrate material opposite the side where the top layer material will be or is adhered to. In the preferred embodiment, the top layer comprises a plurality of paper and resin layers and the backing layer may be preferably chosen to comprise a paper layer and, possibly, a thermosetting resin, preferably the same resin as the top layer. In a further preferred embodiment, said backing layer is adhered to the synthetic substrate material by the identical adhesive material as used for the adhesion of the top layer material.

In a preferred embodiment, method of the invention is particularly suitable for manufacturing of coated floor, wall or furniture panels. In a further preferred embodiment, wall or floor panels are manufactured at least by subdividing said substrate material and the attached thereto top layer material. In a further preferred embodiment, said floor or wall panels comprise mechanical coupling parts allowing two such panels to become connected to one another at respective edges, wherein a locking in a direction perpendicular to the plane of coupled panels is obtained as well as in a direction perpendicular to the coupled edges and in said plane. The method for manufacturing the panel can comprise the step of providing such panels with coupling elements configured for being coupled with coupling elements of adjacent panels thereby limiting or preventing drifting apart of said panels in a direction that is perpendicular to the plane of the panel and/or in a direction that lies on the plane of said panel. Preferably, herein this relates to coupling means of the type known as such from WO 97/47834. Preferably, said coupling means substantially are made as a tongue-in-groove coupling, which is provided with locking means or locking parts, wherein said tongue-in-groove coupling realizes said vertical locking, whereas said locking means or parts are provided for realizing said locking in horizontal direction. It should be understood by a skilled person that other types of coupling mechanisms are possible without departing from the scope of the present invention.

As mentioned here above, it is noted that initially the method of the invention preferably leads to larger half products comprising the substrate material and the adhered thereto top layer material, of which by means of an additional dividing step panels are obtained having the size or approximately the size of the coated panels to be finally obtained. The dividing step may be performed by means of cutting, punching, sawing or the like. After division further finishing steps may be performed for example with the aim of forming said coupling means at the edges of the coated panels.

In a second independent aspect, the present invention aims at a laminated decorative material, which material is preferably suitable for use in the improved method for manufacturing coated panels according to the first aspect of the invention, and seeks, in accordance with several of its preferred embodiments, to solve one or more of the problems arising from the state of the art.

According to the second aspect, the invention relates to a laminated decorative material comprising at least a decorative paper layer, a surface of thermosetting resin applied at the side of said paper layer comprising the decor, and a layer of polymeric material at the side of said paper layer opposite the side comprising the decor.

In a preferred embodiment, the laminated decorative material comprises plurality of paper and/or thermosetting resin layers, which are laminated, and said laminated material comprises a transparent paper or resin sheet at the side of said decorative layer having a decor and/or a underlaying paper sheet at the side of said decorative layer opposite said decor. In a preferred embodiment, the transparent paper and/or resin layer at the side of said decorative layer comprises wear-resistant particles, such as corundum (aluminum oxide), ceramic particles and the like, and allows for an improved scratch resistance and mechanical properties of the laminated decorative material.

Preferably, said thermosetting resin comprises a melamine resin. Melamine resin was found to be particularly advantageous for improving the mechanical properties and scratch resistance of said laminated decorative material. In another embodiment, said thermosetting resin preferably comprises a crosslinked or cross linkable acrylic or unsaturated polyester resin.

In a further preferred embodiment, said thermosetting resin is at least partially cured, preferably fully cured thermosetting resin.

In general, the laminated decorative material of the second aspect of the invention may comprise similar layers as the paper and resin based top layer materials described in connection with the first aspect of the invention, and further comprises at least said layer of polymeric material at the bottom of said top layer material.

Preferably, said polymeric material applied at the side of said paper layer opposite the side comprising the decor, may act as an adhesive, or a hotmelt glue or a non-woven polymer layer which could be softened upon heating. Said polymeric material is particularly advantageous for further processing using a heat manipulation. Said polymeric material may be applied as a layer or a foil on the side of the decorative layer opposite to the side which comprises the decor. In another preferred embodiment, said polymeric material may be applied in a form of fibers, which fibers may or may not at least partially penetrate the paper layers located opposite the side of the decorative layer which comprises the decor. In a preferred embodiment, said polymer layer comprises polyurethane or polyester or copolyester or acrylic resin or polyvinyl acetate. Any polymer material which may act as an adhesive may be applied as a polymer material in a form of a layer or a foil or fibers, which fibers may or may not penetrate to the paper layer placed opposite to the decorative layer side which comprises the decor.

In a further preferred embodiment, said layer of polymeric material is an extruded layer or a textile layer, woven or non-woven.

In a further preferred embodiment, said layer of polymeric material forms less than half of the thickness of said laminated decorative material. As such, said laminated decorative material is convenient for further processing and does not interfere with any structure on the surface of the extruded substrate material or its function. Furthermore said laminated decorative material can still be rolled or provided in any other manner for further processing.

In another preferred embodiment, said laminated decorative material may be provided from a roll.

In a preferred embodiment, the laminated decorative material may comprise a surface texture, i.e. the laminated decorative material may be embossed. In a further preferred embodiment, said laminated decorative material is embossed in register with the decorative layer of said laminated decorative material. In this manner, the laminated decorative material is characterized by an improved esthetic appearance, in addition to the improved mechanical properties.

The laminated decorative material may be suitable to be used as a top layer material, or CPL, in the method for manufacturing of the coated panels according to the first aspect of the invention.

In a preferred embodiment, said laminated decorative material comprises aluminum oxide, i.e. corundum particles at a position above said decor. In a further preferred embodiment, said aluminum oxide particles are positioned in or on an additional layer, which may be a transparent paper layer and/or a resin layer. In a particularly preferred embodiment, said aluminum oxide particles are placed in a resin impregnated transparent paper layer.

In a preferred embodiment, said laminated decorative material comprises a lacquer layer on the top of the side comprising decor. In a particularly preferred embodiment, said lacquer layer comprises polyurethane.

In another third independent aspect, the invention pertains to a method for manufacturing a laminated decorative material according to the second aspect of the invention. In a preferred embodiment, the invention relates to a method for manufacturing a laminated decorative material, characterized in that a resin impregnated decor paper is heat pressed to a polymeric foil or polymeric textile, woven or non woven. Heat pressing of a decor paper to a polymeric foil or a textile is shown to be advantageous for adhesion of the decor paper layer to said polymeric foil or polymeric textile.

In a further preferred embodiment, said resin impregnated decor paper is heat pressed to said foil by means of an adhesive layer. In a preferred embodiment, said adhesive layer comprises at least a polymer material. In a further preferred embodiment, said polymer material is comprised in said polymeric foil or polymeric textile adhered to the decor paper.

According to the most preferred embodiment of the present invention according to any of its aspects, the method for production of coated panels is provided, wherein a top layer which is paper and thermosetting resin based, preferably a CPL, is continuously provided and adhered by means of the adhesive material, to a synthetic substrate material, preferably an extruded SPC or a filled thermoplastic composite, and wherein said extrusion of SPC or the filled plastic composite is inline with the step of adhesion of the top layer. In a particularly preferred embodiment, said top layer material, preferably CPL, is obtained by impregnation of a plurality of layers of paper and/or a thermosetting resin, and subsequently pressing together said layers wherein said resin is preferably cured. As such, said top layer material is consolidated and may be optionally embossed prior to the step of adhering of such, e.g. CPL, top layer to the synthetic substrate material which is preferably the SPC or the filled plastic composite layer. In a particularly preferred embodiment, said top layer, preferably the CPL is continuously provided, for example from a roll. The synthetic substrate material, preferably the SPC or the filled plastic composite material is extruded in line with the adhesion of the top layer material. In the preferred embodiment of the method of the invention, the granulate comprising the polymer material and filler is preferably continuously fed to an extruder, and the SPC or the filled plastic composite layer is obtained in a processing line continuously, which allows for a continuous and inline adhering to a provided CPL layer. The adhesive material is preferably provided by spraying or a roll application in between said top layer and the synthetic substrate material. Alternatively, the adhesive material may be mixed and co-extruded with the synthetic substrate material. Alternatively, the adhesive material may be provided as a foil or a textile layer, woven or non-woven inline with the extrusion of the polymeric substrate material. Optionally, said adhesive material may be adsorbed onto a bottom of the top layer material, i.e. on the lowermost layer of the top layer material, which is preferably and least in part not saturated by the resin.

In an additional fourth independent aspect, the present invention concerns a coated panel comprising a paper and thermosetting resin based top layer, preferably CPL, a polymer adhesive material and an extruded synthetic substrate material, which is preferably an SPC or a filled plastic composite. Said top layer preferably comprises plurality of paper and/or thermosetting resin layers, which are preferably laminated, e.g. to form said CPL. Preferably, said, e.g. CPL, top layer comprises at least a decorative layer including a thermosetting resin. At least a transparent paper or resin sheet is present at the side of said decorative layer having the decor, which preferably comprises wear-resistant particles, such as corundum particles. Furthermore, said, e.g. CPL, top layer further comprises at least an underlaying paper sheet at the side of said decorative layer opposite to said decor, and said underlying paper sheet is at least partially not saturated with the thermosetting resin.

In a particularly preferred embodiment, said coated panel comprises an, e.g. CPL, top layer which is impregnated with a melamine resin. Said melamine resin is preferably fully cured. Preferably, said top layer is embossed, more preferably embossed prior to adhering onto the synthetic substrate material. In a particularly preferred embodiment, the top layer is embossed in register with the decorative layer.

In a preferred embodiment, the adhesive material is provided as a layer, a foil, fibers, or a woven or non-woven textile layer, between said top layer and the synthetic substrate material. Said adhesive material preferably comprises polymer material, preferably the same polymer material as the synthetic substrate material. Some non-limiting examples are polyurethane or polyester or copolyester or acrylic resin or polyvinyl acetate. In a preferred embodiment, said adhesive material is co-extruded with the synthetic substrate material. Said adhesive material may comprise PVC.

The synthetic substrate material according to the preferred embodiment is a filled SPC, preferably comprising polymer material and filler in a content of at least 50 wt. % of the synthetic substrate material. In a particularly preferred embodiment, said synthetic substrate material is extruded. The top layer, preferably a CPL is adhered inline with the extrusion of the synthetic substrate material by means of the adhesive material.

With the intention of better showing the characteristics according to the invention, in the following, as an example without limitative character, an embodiment is described, with reference to the accompanying drawings, wherein:

FIG. 1 schematically shows a top view of a coated panel 1 obtainable by a method according to an embodiment of the first aspect of the invention;

FIG. 2 on a larger scale, schematically shows a cross-section according to line II-II in FIG. 1;

FIG. 5 represents a view on the area indicated with F5 in FIG. 4; and FIGS. 6 to 8 in a view similar to that of FIG. 5 show alternatives.

Figure 1:
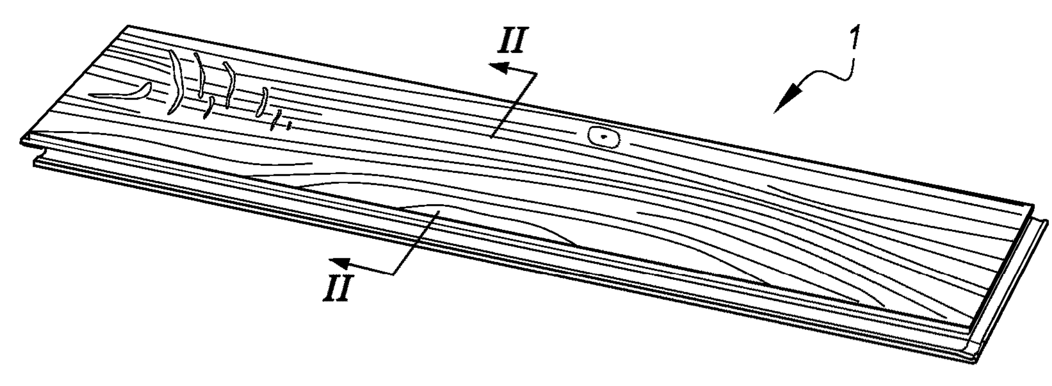
Figure 2:
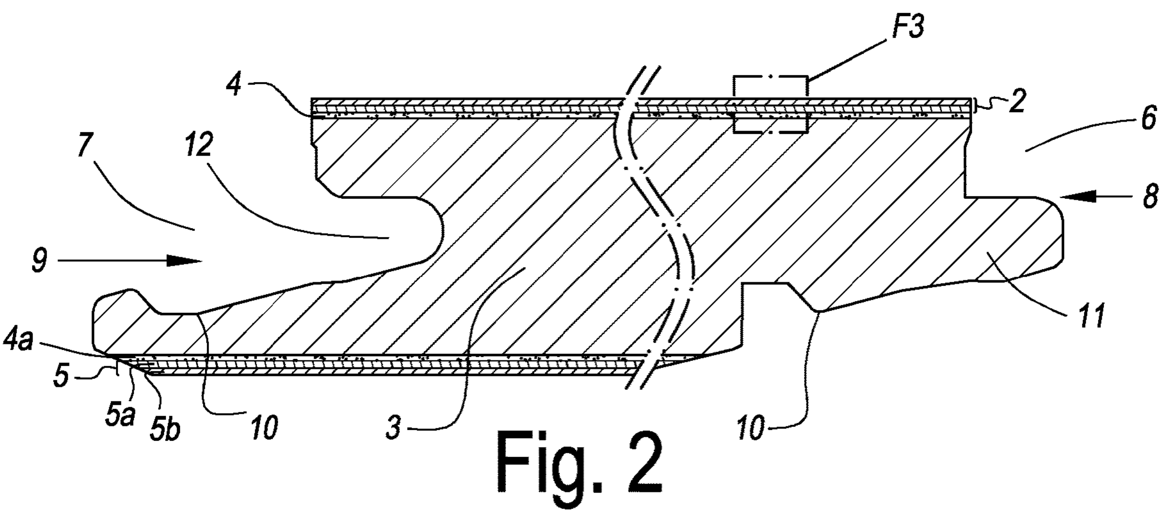
Figure 3:
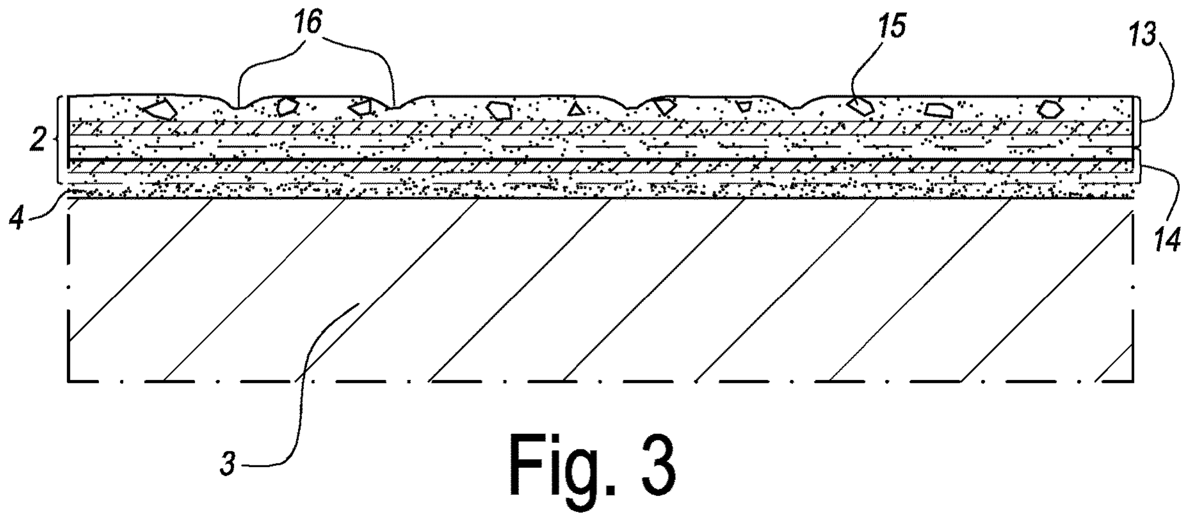
FIG. 3 show an enlarged view of the section F3 of FIG. 2.

In the represented example, as depicted in FIGS. 1-3, the coated panel 1, which is produced by a method according to the first aspect of the invention, comprises the top layer material 2, the synthetic substrate material 3, and an adhesive material 4 situated between the top layer material 2 and the synthetic substrate material 3. The coated panel 1 obtained by the method of the invention in the embodiment shown here features a backing layer 5, preferably said backing layer 5 features at least a paper layer impregnated with a thermosetting resin, as shown in FIG. 2. In the present case the backing layer 5 includes two paper layers 5*a*, 5*b* and an adhesive material layer 4*a*. In FIGS. 1 and 2, a coated floor panel is shown, but it should be understood that a coated panel of the invention may be suitable for other uses, for example as a wall or celling panel of as a furniture panel.

The coated panels 1 can be of various shape, for example, rectangular or square, or of any other shape, depending on the use.

As shown in FIGS. 1 and 2, preferably each coated panel 1 is, at least at the edges of two opposite sides 6-7, provided with coupling parts 8-9 which allow that two adjacent panels 1 can be coupled to each other. The coupling parts 8-9, as represented in the FIGS. 1 and 2, are provided with integrated mechanical locking means 10 which prevent the drifting apart of two coupled panels 1; the coupling parts 8-9 and the locking means 10 are realized in one piece with the synthetic substrate material 3 of the coated panels 1.

The coupling parts 8-9 can be realized in various forms, although the basic forms are preferably formed, as in the example, by a tongue 11 and a groove 12.

The coupling parts 8-9 provide for that two coated panels 1 which are coupled to each other cannot perform a lateral movement in the horizontal plane in respect to each other, which allows to mutually couple a plurality of such panels to each other.

FIG. 3 shows an enlarged top section of the coated panel 1 obtainable by the method according to the first aspect of the invention. The top layer material 2 is the laminated material comprising two impregnated paper layers 13-14 which are preferably forming a CPL top layer material 2. As shown in FIG. 3, the transparent paper impregnated with at thermosetting resin 13 is situated on the top of the top layer 2. Said layer 13 preferably, as is the case here, further comprises corundum, i.e. aluminum oxide particles 15 and may serve as a wear layer. The layer 13 shown in FIG. 3 is preferably embossed, and features the surface texture 16. The another impregnated paper layer 14 of the top layer material 2 is a decorative layer 14. The adhesive material 4 is situated between said top material layer 2 and the synthetic substrate material 3.

Figure 4:
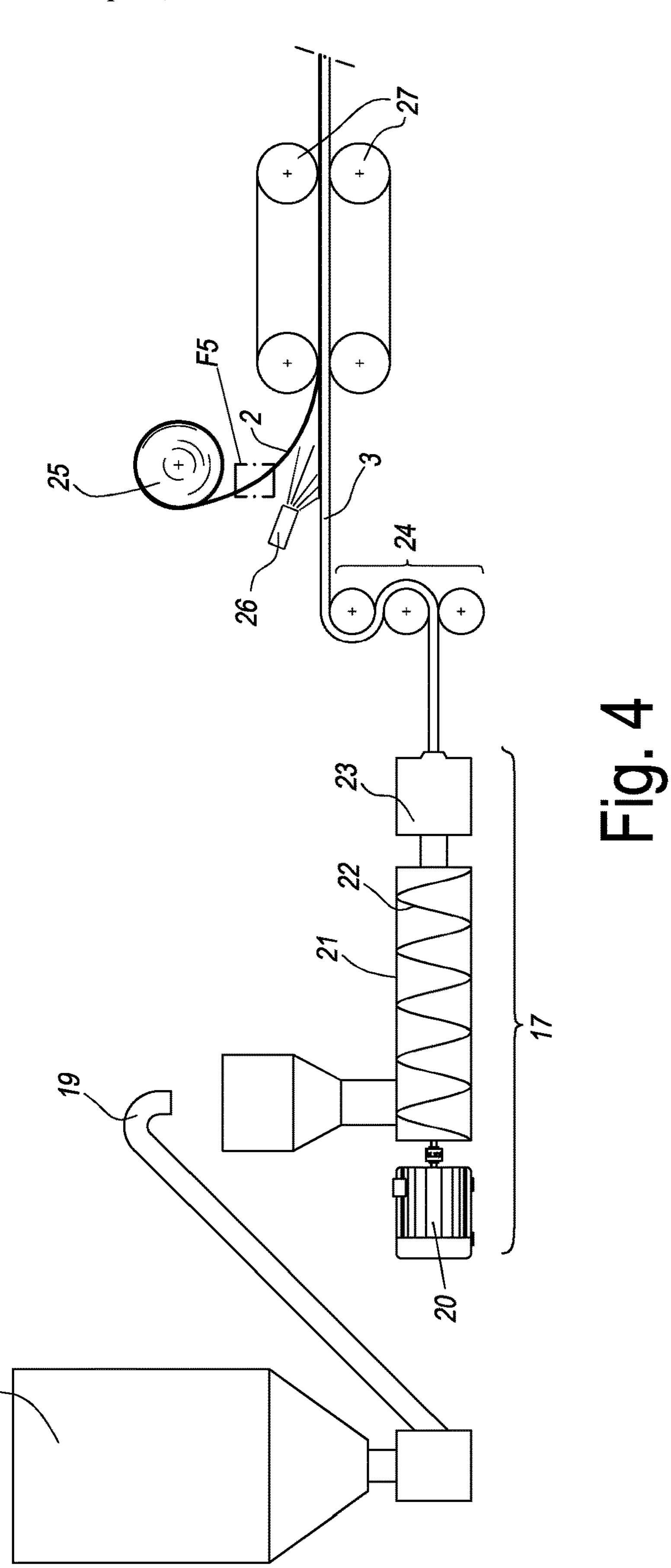
FIG. 4 shows some steps in a method according to the first aspect of the invention.

FIG. 4 shows a possible embodiment of the method of the invention as well as schematically represents the installation applied therewith. In FIG. 4 an installation comprises a device 17 for extruding the synthetic substrate material 3. In FIG. 4, the preferred equipment, comprises a vessel 18 for preparation of the powder and/or granulate comprising substrate material, i.e. preferably at least a polymer material and a filler. Said granulate is fed to an extruder 17 by a feeding pipe 19. The extruder is operated by a motor 20, and equipped by an extruding section 21 which comprises at least one screw 22, whereby the molten substrate material is pushed to and through a die 23. In a preferred embodiment, said die 23 is a flat die, having an opening corresponding to the dimensions of the substrate material to be obtained, for example 2 to 5 mm thick and 0.8 to 2.1 m wide, wherein a width of about 1.3 m is preferred. Said die 23 allows for obtaining a substantially flat layer of an extruded thermoplastic substrate material, which may be optionally additionally calibrated for a desired thickness in a roll system 24. In a most preferred embodiment, said extruded synthetic substrate material 3 comprises filled plastic composite material, more preferably PVC and the filler $CaCO_3$. In an alternative embodiment, the adhesive material 4 is mixed and coextruded with the synthetic substrate material 3. In the embodiment of FIG. 4, the synthetic substrate material 3 is provided from a roll 25 and adhered to a top layer material 2, by means of at least the adhesive material 4. In FIG. 4, a preferred embodiment wherein a step of providing the adhesive material 4 onto the synthetic substrate material 3 and the bottom i.e. the lowermost paper layer of the top layer 2 by means of an adhesive application device, such as a sprayer 26, is shown. The top layer material 2, the adhesive material 4 and the synthetic substrate material 3 are further subjected to a pressing step, and pressed together preferably by means of a double belt press 27.

As shown in FIG. 5, the top layer material 2 is essentially made of two paper layers impregnated with resin 13-14, and is preferably a CPL. In FIG. 5, the top layer material 2 comprises at least a resin impregnated transparent paper layer 13 on the top, and a decorative paper layer 14 which is preferably, as is the case here, impregnated and features a decor 28. The resin impregnated transparent paper sheet 13 preferably comprises wear-resistant particles 15 and, in this example, additionally features the surface texture 16.

FIG. 6 shows an alternative to the top layer material 2 shown in FIG. 5, which alternative, in addition to that what is illustrated in FIG. 5, comprises an additional, underlying paper layer 29, placed on the side opposite of the decor of the decorative layer 14. Said additional paper layer 29 is preferably at least in part free from, i.e. not impregnated, with a thermosetting resin, preferably such that a lower most portion of the thickness of the paper layer 29 is substantially free from resin, said portion forming preferably at least 10%, and even better at least 30% of the thickness of the paper layer 29. In the embodiment shown in FIG. 6, the underlaying paper sheet 29 may absorb at least a part of the adhesive material 4, allowing for a more efficient and strong adhesion of the top layer material 2 to the synthetic substrate material 3.

FIG. 7 shows a laminated decorative material 30, in accordance with the second aspect of the invention, i.e. a top layer material 2 comprising two paper layers 13-14 impregnated with the resin as shown in FIG. 5, and an adhesive material layer 4. The adhesive material 4 comprises a layer of polymeric material, being a foil 31, and a layer 32 adhering said foil to the resin impregnated layers 13-14. Said foil 31 is present on the side opposite from the decor 28 of the decorative layer 14. Said foil 31 is in this case on the outer surface of the laminated decorative material 30. Said foil 31 preferably comprises extruded polymer material, and which may act for adhering said laminated decorative material 30 to a substrate material layer 2.

FIG. 8 shows the laminated decorative layer 30 comprising two paper layers 13-14 impregnated with the resin as shown in FIG. 5, and an adhesive material layer 4. In this case the adhesive material layer 4 comprises polymer melt fibers 33, and a layer 32 adhering said polymer melt fibers 33 to the resin impregnated paper layers 13-14. Said polymer fibers 32 may act for adhering said laminated decorative material 30 to a substrate material layer 2.

Preferably the foil 31 of FIG. 7, and the melt fibers 33 of FIG. 8, comprise a polymer material similar or identical to the substrate material layer 2 to which is meant to be adhered.

It is noted that the decorative laminated materials 30 from FIGS. 7 and 8 can be used in a method in accordance with the first aspect, such as the one illustrated in FIG. 4. In such case the adhesive application device or sprayer 26 may be omitted, since the decorative laminated material incorporates an adhesive material layer 4.

It is further noted that the top layer material 4 as illustrated in the FIGS. 7 and 8 also form embodiments of the laminated decorative material 30 of the second independent aspect as mentioned in the introduction.

The invention is further disclosed by the following paragraph list as defined by the below numbered paragraphs.

1.—Method for manufacturing a coated panel 1, said method at least comprising the following steps:

the step of providing a top layer material 2 at least comprising a decorative layer 14 including thermosetting resin;

the step of providing adhesive material 4;

the step of extruding a synthetic substrate material 3 in a continuous manner;

said synthetic substrate material 3 at least comprising polymeric material; characterized in that the method further comprises the step of adhering, in a continuous manner, said top layer material 2 to said substrate material 3 by means of at least said adhesive material 4, wherein said step of adhering takes place inline with said step of extruding said substrate material 3.

2.—Method according to claim 1, characterized in that said thermosetting resin is at least semi-cured, and preferably fully cured, prior to said step of adhering.

3.—Method according to any of the preceding claims, characterized in that said top layer material 2 is a laminated material comprising a plurality of paper and/or resin layers.

4.—Method according to claim 3, characterized in that said laminated material comprises a transparent paper sheet 13 at the side of said decorative layer 14 having a decor 28 and/or a underlaying paper sheet 29 at the side of said decorative layer 14 opposite said decor 28.

5.—Method according to any of the preceding claims, characterized in that said top layer material 2 is or comprises a so-called CPL or continuously pressed laminate.

6.—Method according to any of the preceding claims, characterized in that said top layer material 2 is provided from a roll 25, and is, preferably continuously, unrolled to be adhered to said substrate material 3.

7.—Method according to any of the preceding claims, characterized in that said top layer material 2 comprises at least a portion of said adhesive material 4 on a bottom of said top layer material 2, and/or in that at least a portion of said adhesive material 4 is provided at the bottom of said top layer material 2.

8.—Method according to claim 7, characterized in that said top layer material 2 comprises on said bottom a layer 29, wherein said layer has absorbed or absorbs at least a portion of said adhesive material 4.

9.—Method according to any of the preceding claims, characterized in that at least a portion of said adhesive material 4 is provided on said substrate material 3 after extrusion, and/or is comprised in said extruded substrate material 3.

10.—Method according to any of the preceding claims, characterized in that said adhesive material 4 comprises at least a polymeric material identical to the polymeric material of said synthetic substrate material 3.

11.—Method according to any of the preceding claims, characterized in that said adhesive material 4 at least comprises polyurethane or polyester or copolyester or acrylic resin or polyvinyl acetate.

12.—Method according to any of the preceding claims, characterized in that said adhesive material 4 is a hotmelt glue.

13.—Method according to any of the preceding claims, characterized in that said adhesive material 4 comprises melt fibers, preferably provided as a non-woven textile comprising such fibers.

14.—Method according to any of the preceding claims, characterized in that said polymeric material is chosen from the list consisting of polyvinyl chloride, polyurethane, polyethylene, polypropylene, polyethylene terephthalate, polyester.

15.—Method according to any of the preceding claims, characterized in that said synthetic substrate material 3 is filled synthetic composite comprising mainly said polymeric material and a filler material.

16.—Method according to claim 15, characterized in that said filler material comprises at least $CaCO_3$, preferably in a weight ratio with said polymeric material of 2:1 or larger.

17.—Method according to any of the preceding claims, characterized in that said synthetic substrate material 3 further comprises reinforcing materials.

18.—Method according to any of the preceding claims, characterized in that said top layer material 2 comprises a surface texture 16.

19.—Method according to any of the preceding claims, characterized in that said thermosetting resin comprises melamine resin.

20.—Method according to any of the preceding claims, characterized in that said thermosetting resin comprises a crosslinked or cross linkable acrylic or unsaturated polyester resin.

21.—Method according to any of the preceding claims, characterized in that said thermosetting resin comprises photo-initiators.

22.—Method according to claim 21, characterized in that said thermosetting resin is submitted to a radiation curing after said step of providing said top layer material.

23.—Method according to any of the preceding claims, characterized in that said method further comprises the step of providing a lacquer layer on top of said top layer material.

24.—Method according to any of the preceding claims, characterized in that said extruded material is calibrated to the desired thickness and possibly structured prior to adhering said top layer material 2 thereto.

25.—Method according to any of the preceding claims, characterized in that said method further comprises the step of providing a backing material 5, and the step of applying said backing material 5 to the side of said synthetic substrate material 3 opposite the side where the top layer material 2 will be or is adhered to.

26.—Method according to any of the preceding claims, characterized in that floor or wall panels are manufactured at least by subdividing said substrate material 3 and the attached thereto top layer material 2.

27.—Method according to claim 26, characterized in that said floor or wall panels 1 comprise mechanical coupling parts 8-9 allowing two such panels to become connected to one another at respective edges, wherein a locking in a direction perpendicular to the plane of coupled panels is obtained as well as in a direction perpendicular to the coupled edges and in said plane.

28.—Laminated decorative material 30 comprising at least a decorative paper layer 14, a surface of thermosetting resin applied at the side of said paper layer comprising a decor 28, and a layer of polymeric material at the side of said paper layer 14 opposite the side comprising the decor 28.

29.—Laminated decorative material 30 according to claim 28, characterized in that said layer of polymeric material forms less than half of the thickness of said laminated decorative material 30.

30.—Laminated decorative material 30 according to claim 28 or 29, characterized in that said layer of polymeric material is an extruded layer or a textile layer, woven or non-woven.

31.—Laminated decorative material 30, characterized in that said decorative material comprises aluminum oxide particles at a position above said decor 28.

32.—Method for manufacturing a laminated decorative material 30, characterized in that a resin impregnated decor paper 14 is heat pressed to a polymeric foil 31 or polymeric textile, woven or non woven.

33.—Method according to claim 32, characterized in that said resin impregnated decor paper 14 is heat pressed to said foil 31 by means of an adhesive layer 4.

The present invention is in no way limited to the above described embodiments, but such methods, coated panels and laminated decorative materials may be realized according to several variants without departing from the scope of the invention.

The invention claimed is:

1. A method for manufacturing a coated panel, the method at least comprising:

providing a top layer material from a roll, wherein the top layer material at least comprises a decorative layer of paper impregnated with thermosetting resin wherein the thermosetting resin is at least semi-cured, wherein a protective layer is present on top of the decorative layer, wherein the protective layer is based on thermosetting resin and comprises wear-resistant particles, wherein the top layer material comprises a surface texture;

providing adhesive material;

extruding a synthetic substrate material in a continuous manner, the synthetic substrate material at least comprising polymeric material;

wherein the method comprises continuously unrolling and adhering, in a continuous manner, the top layer material to the substrate material by at least the adhesive material, wherein the adhering takes place inline with the extruding of the substrate material.

2. The method of claim 1, wherein the thermosetting resin is at least semi-cured, or fully cured, prior to the adhering.

3. The method of claim 2, wherein the top layer material is a laminated material comprising a plurality of paper and/or resin layers.

4. The method of claim 3, wherein the top layer material is or comprises a CPL or continuously pressed laminate.

5. The method of claim 1, wherein the top layer material comprises at least a portion of the adhesive material on a bottom of the top layer material, and/or wherein at least a portion of the adhesive material is at the bottom of the top layer material.

6. The method of claim 5, wherein the top layer material comprises on the bottom a layer, wherein the layer has absorbed or absorbs at least a portion of the adhesive material.

7. The method of claim 1, wherein at least a portion of the adhesive material is on the substrate material after extrusion, and/or is comprised in the extruded substrate material.

8. The method of claim 1, wherein the adhesive material comprises at least a polymeric material identical to the polymeric material of the synthetic substrate material.

9. The method of claim 1, wherein the adhesive material at least comprises polyurethane or polyester or copolyester or acrylic resin or polyvinyl acetate.

10. The method of claim 1, wherein the synthetic substrate material is a filled synthetic composite wherein the polymeric material and a filler material comprise at least 50 wt. % of the synthetic substrate material.

11. The method of claim 10, wherein the filler material comprises at least $CaCO_3$, or comprises $CaCO_3$ in a weight ratio with the polymeric material of 2:1 or larger.

12. The method of claim 1, wherein the floor or wall panels are manufactured at least by subdividing the substrate material and the attached thereto top layer material and wherein the floor or wall panels comprise mechanical coupling parts allowing two such panels to become connected to one another at respective edges, wherein a locking in a direction perpendicular to a plane of coupled panels is obtained as well as in a direction perpendicular to coupled edges and in the plane.

* * * * *